United States Patent

[11] 3,630,801

[72] Inventor John L. Booth
   1317 Tangelo Isle, Ft. Lauderdale, Fla. 33315
[21] Appl. No. 876,665
[22] Filed Nov. 14, 1969
[45] Patented Dec. 28, 1971
[32] Priority Jan. 14, 1969
[33] Philippines
[31] 9912

[54] MACHINE FOR PRODUCING CONTINUOUS COMPRESSED HONEYCOMB
27 Claims, 12 Drawing Figs.

[52] U.S. Cl. ..................................... 156/197, 156/548
[51] Int. Cl. ...................................... B31d 3/02
[50] Field of Search ........................... 156/197, 548

[56] References Cited
UNITED STATES PATENTS

| | | | |
|---|---|---|---|
| 2,649,131 | 8/1953 | Lincoln .................. | 156/197 |
| 2,992,673 | 7/1961 | Bishop .................... | 156/197 X |
| 3,066,722 | 12/1962 | Adams et al. ............ | 156/197 X |
| 3,242,024 | 3/1966 | Bova et al. ............... | 156/197 |
| 3,477,893 | 11/1969 | Brazener et al. .......... | 156/197 |
| 3,493,450 | 2/1970 | Judge, Jr. ................ | 156/197 |

Primary Examiner—Samuel Feinberg
Assistant Examiner—G. E. Montone
Attorney—Dugger, Peterson, Johnson & Westman ABSTRACT: A machine for making a continuous unexpanded honeycomb product from a single continuous web of unexpanded material that includes a severing assembly for longitudinally severing the web into a plurality of strips of material, an applicator assembly for applying longitudinally spaced, transverse strips of adhesive to the one face of each of the severed strips of material, an assembly for turning the severed strips into face to face engagement with one another, a conveyor assembly to press the adhesive strips of one strip of material against the adjacent strip of material to provide a multiple layer of joined strips of material while the strips of material are pinned to another, a flying saw assembly to transversely sever the multiple layer to be of a predetermined length, a stacking box assembly for joining one face of one multiple layer of adhered strips of material to a face of another multiple layer of adhered strips of material, and a trimmer assembly to trimming the joined multiple layers to a predetermined height. Adjustments are provided for severing different width strips, for controlling the application of adhesive strips, and for varying the thickness of the joined multiple layers. Also, during making of the honeycomb product the strips of material are partially severed to readily permit a block of honeycomb product being pulled apart to provide two honeycomb structures. Also a method of making honeycomb is disclosed.

INVENTOR.
JOHN L. BOOTH

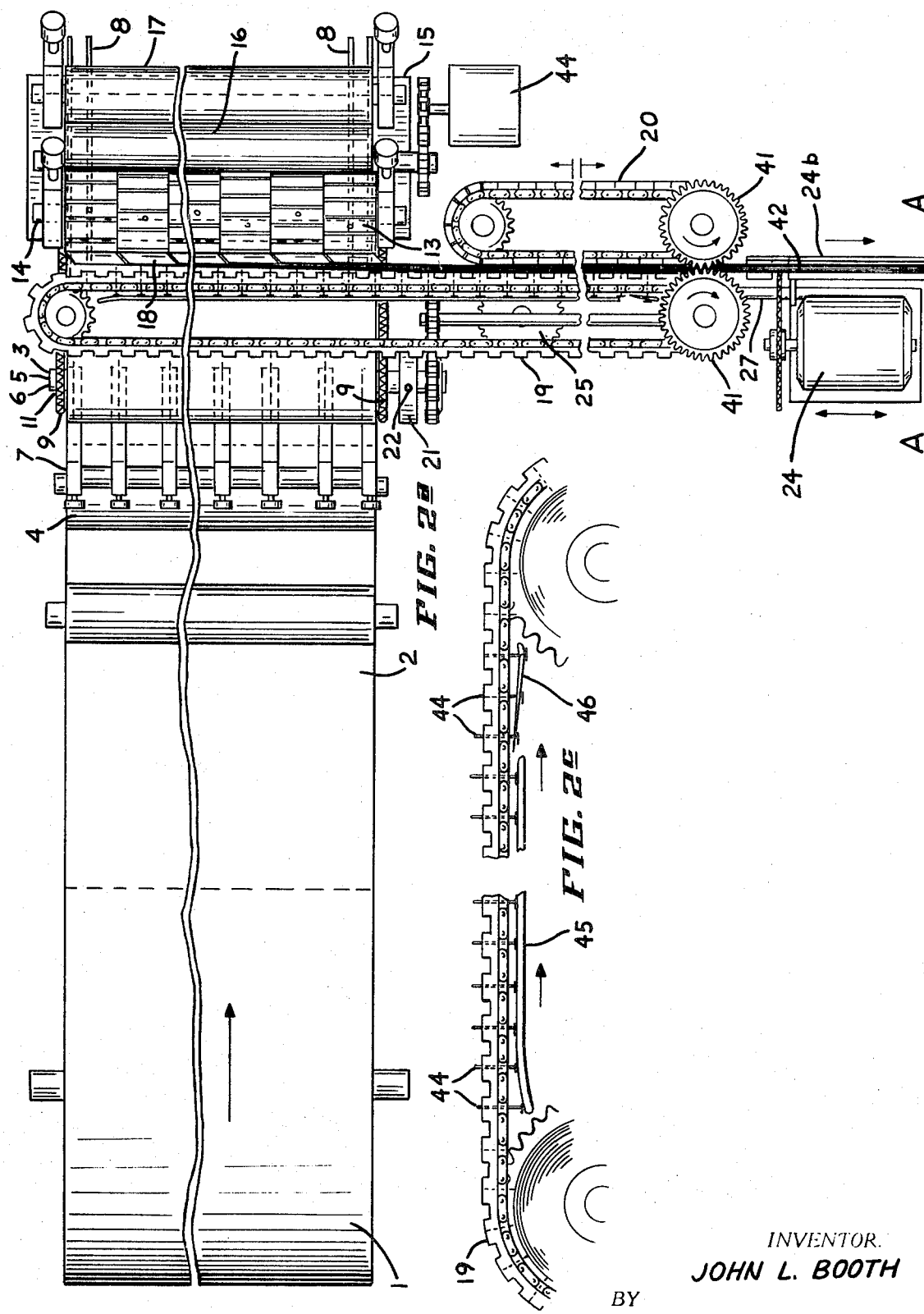

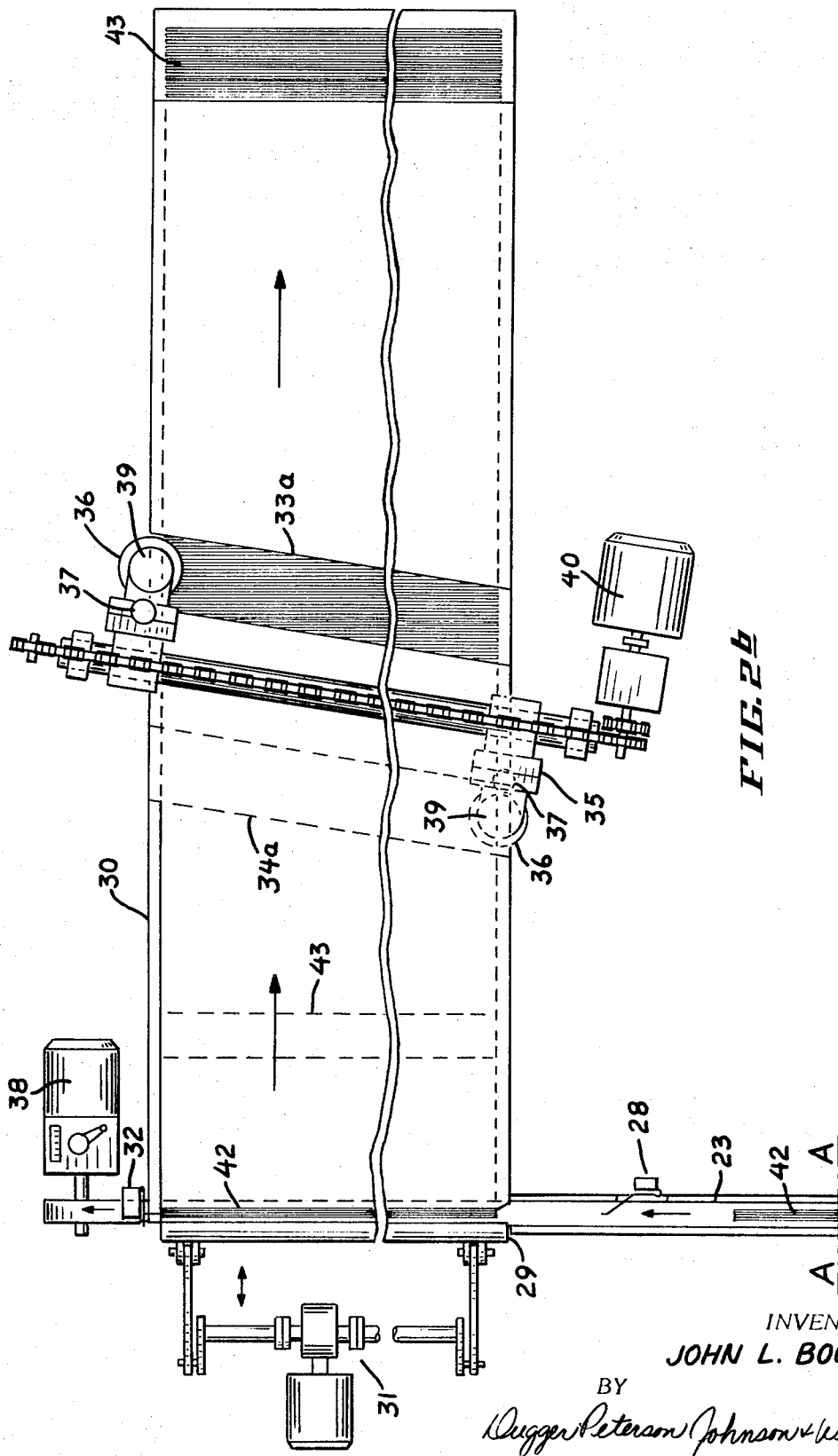

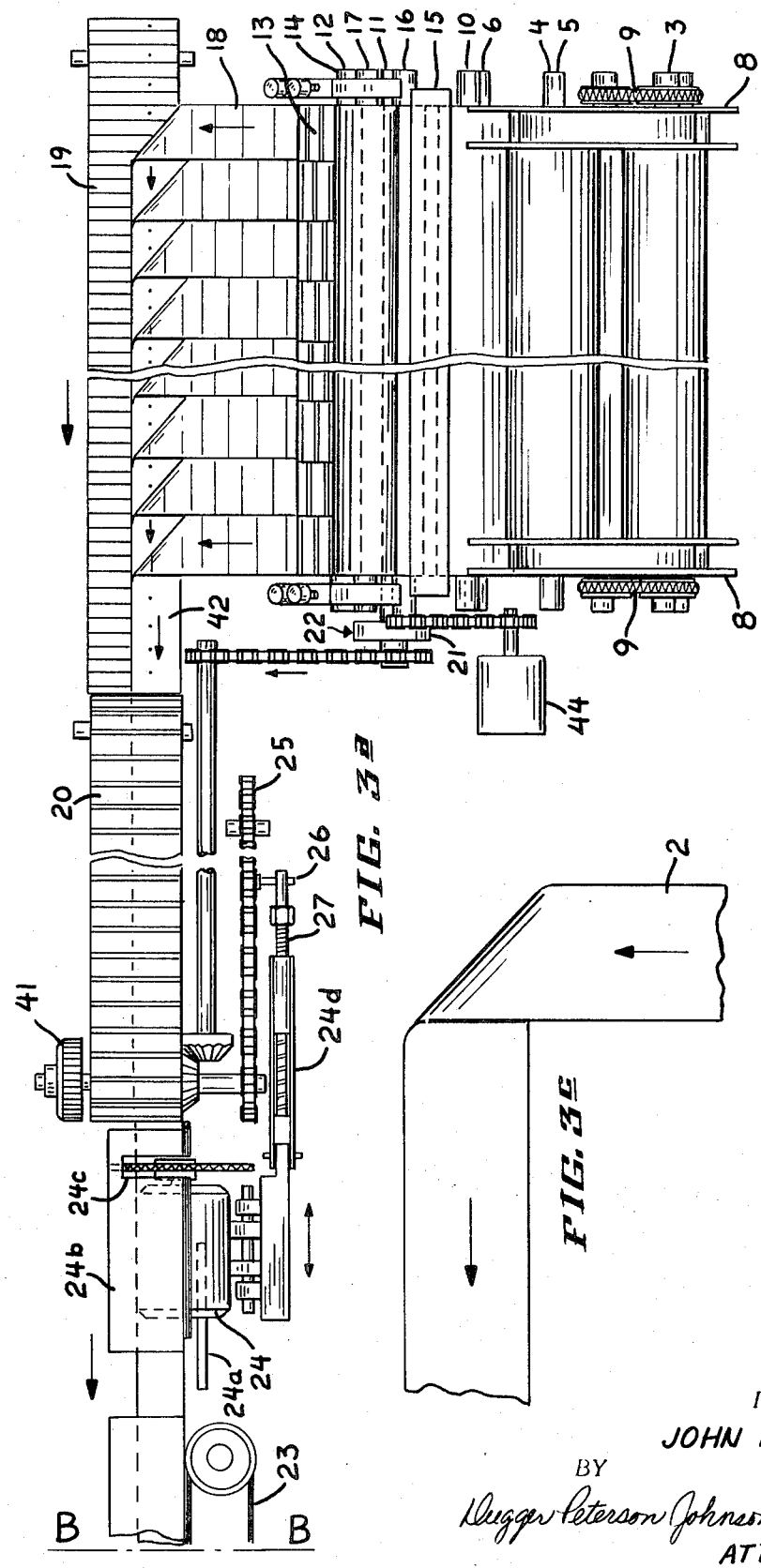

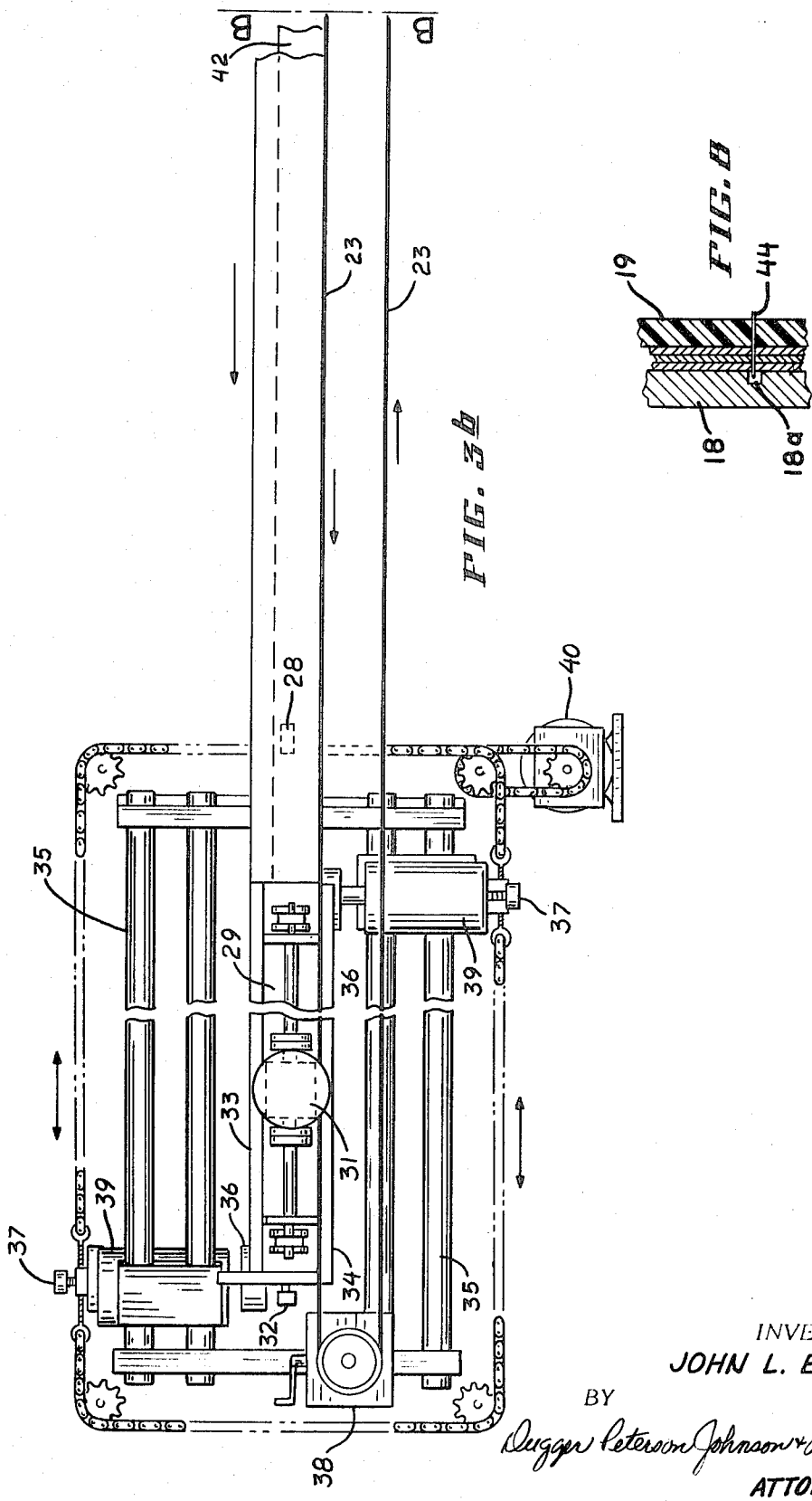

MACHINE FOR PRODUCING CONTINUOUS COMPRESSED HONEYCOMB

This invention relates to a new and improved machine and method for automatically producing from a single web of thin flexible sheet material, a continuous unexpanded compressed honeycomb product of any desired width and cell size with single or multiple thicknesses of any desired dimension being produced simultaneously.

It is a general object of this invention to provide a method and machine to progressively fabricate from a single web of thin flexible material such as paper, metal foil, plastic, cloth or any other suitable material, an open-ended cellular product of any desired width and cell size and with a single or multiple thickness of any desired dimension that could be used for many purposes as for instance, interior core material for doors, panels, desk tops and many other structural products as well as for decorative and other useful items as for instance lamp shades, hats, toys and decorations.

It is the specific object of this invention to provide an improved method and machine for producing continuous unexpanded honeycomb products of any desired width and cell size with single or multiple thicknesses simultaneously from a single continuous moving web of thin flexible material by cutting the web longitudinally into a plurality of narrow strips of proper widths, applying properly spaced transverse lines of adhesive on each of the narrow strips, turning each of the narrow strips over its respective turn bar to bring them into edgewise position in face-to-face relation to each other to form a continuous multilayer strip having the adhesive lines of each strip in proper relation to the adhesive lines of each adjacent strip while simultaneously being pinned into this precise position by an automatic pinning conveyor and then moving through a laminating conveyor belt to fasten the adhesive lines to their adjacent strips, then cutting the resulting multilayer strip into precise lengths and moving these cut lengths by means of a conveyor system into a horizontal stacking and adhesive curing box where the cut multilayer strips are joined together one against the other to form a continuous unexpanded block of honeycomb which moves forward as a unit an amount equal to the thickness of each multilayer strip as each strip is pressed into the stacking box causing the block of continuous honeycomb to be moved ahead into the honeycomb sizing cutter heads to produce a precise microthickness of the finished honeycomb product.

It is also an object of this invention to provide a method and machine for producing continuous honeycomb products which uses a series of adhesive-applying rings placed on a mandrel roll, each ring corresponding in width to its respective cut strip and having the printing surface of each ring spaced so as to imprint the transverse adhesive lines on the face of its respective strip with the proper spacing to produce the desired cell size and each ring being constructed in such a way that it can be rotated in either a forward or backward motion in order to allow the adhesive lines to be imprinted on the respective strips in proper relation to each adjacent strip to result in the proper aligning of the lines of adhesive on each strip in relation to the adjacent strip after the strips have been placed in edgewise position in face-to-face relation to each other to assure a consistent cell pattern when the honeycomb is expanded. Each adhesive applying ring to have a setscrew incorporated in it to lock it in the timed position on the mandrel roll after having been rotated forward or backward to the desired position to result in the proper positioning of the adhesive lines on the rings respective strip.

It is another object of this invention to provide a method and machine for producing continuous unexpanded honeycomb in which the cell size can be varied quickly and accurately by interchanging mandrels having adhesive-applying rings installed with the properly spaced adhesive-applying lines to produce the desired cell size. Once each cell size producing mandrel ring assembly is properly timed, this interchange of cell size control units can be quickly accomplished and the proper timing of the adhesive lines will be automatic.

It is another object of this invention to provide a method and machine for producing continuous unexpanded honeycomb in which the method of placing the cut strips in edgewise position in face to face relation to each other can be accomplished without the necessity of having to rotate each strip 90° with its accompanying strip distortion and excessive space requirements. This is done by bending the strips over their respective turn boards which have their turning surface set at a 45° angle to the direction of the strips travel. As the strip is moving forward and comes in contact with the turning surface of its respective turn board, the strip is caused to change direction 90° and to be placed in an edgewise position in face-to-face relation to the adjacent strip traveling in the same direction resulting collectively in a multilayer strip moving in an edgewise plane.

It is another object of this invention to provide a method and machine for producing continuous unexpanded honeycomb in which the adhesive lines of each strip remain precisely timed or spaced in relation to its adjacent strip a they were timed by the timed adhesive-applying rings, as this strip proceeds through the laminating conveyor which fastens the adhesive lines together by pressure. This is accomplished by each strip being pinned to its adjacent strip by means of a pin-inserting conveyor belt moving along the same path and at the same exact surface speed as the multilayer strip. As each strip turns on its respective turn board, pins which protrude from the surface of the pin conveyor pierce the strip causing it to be pinned to its adjacent strip thereby holding it in fixed position. As the series of strips turn on their respective turn boards, the pins are caused to pierce completely through the multilayer strip holding these strips as a unit, in a fixed position in relation to each other. As the multilayer strip continues on through the laminating conveyor belt, pressure is applied to the multilayer strip causing the adhesive lines therein to laminate to their adjacent strip. Before the multilayer tape emerges from the laminating conveyor, a pin extractor automatically withdraws the pins from the multilayer strip tape which is now securely bound together by the pressure applied to the adhesive lines by the laminating belt. As the outermost layer of the multilayer strip has its adhesive lines exposed in order that each cut strip will adhere to the preceding strip in the stack box, the pin inserting conveyor belt is constructed with raised pressure blocks designed to apply pressure to the multilayer strip between these exposed adhesive lines, leaving them undisturbed as the tape passes through the laminating conveyor.

It is another object of this invention to provide a method and machine for producing continuous unexpanded honeycomb in which each cut section of the multilayer strip, which determines the width of the produced honeycomb, shall be of a precise length and cut at an exact point in order to maintain the proper cell position of each multilayer strip as it is placed in the stacking box adjacent to the preceding strip. This is accomplished by a flying saw arrangement which is connected to the laminating conveyor belt by a pushrod and endless length of chain, the total length of which determines the width of the produced honeycomb. As This chain moves with the laminating belt by a sprocket arrangement, it causes a pushpin which is attached to the chain to come in contact with the push rod of honeycomb flying saw causing the saw to move along a parallel path and at the same exact speed as the multilayer strip. At the proper time the cutting blade of the saw is caused to be pushed into the strip cutting a predetermined length off. The flying saw then returns to its former position. Each complete revolution of the endless chain results in a cutting cycle and the length of the chain will determine the length of the cut strip which in turn determines the width of the finished honeycomb. By varying the length of the chain, an infinite number of honeycomb widths are possible.

It is another object of this invention to provide a method and machine for producing unexpanded honeycomb in one or more thicknesses simultaneously by use of a cutting ring system mounted on a spacer mandrel roll making circular shear action cutter blades mounted so as to contact each cutting ring. Equal width spacers will allow the moving web to be cut into identical strips to produce honeycomb of one thickness while the use of varying width spacers will result in cut strips corresponding to the spacers width, as for example, a 2-inch strip, a 1-inch strip, then a 2-inch, 1-inch and so on for the entire width of the moving web. By using circular cutting blades set to perform a shear action against the cutting rings, and each circular cutting blade that is to cut a 1-inch strip having thin slots in its cutting edge, the resultant produced will be cut strips 3 inches wide having a partially cut portion along its length 1 inch wide. These strips, when processed with their adhesive lines, and fabricated into unexpanded honeycomb will result in a block of honeycomb 3 inches thick that can be pulled apart after expansion into two pieces of honeycomb, one 2 inches thick, the other 1 inch thick. Any practical combination of thicknesses can be produced simultaneously this way and the sizes of 1 and 2 inch are used only for illustration purposes.

It is another object of this invention to provide a method and machine for producing continuous unexpanded honeycomb by use of a push bar and horizontal stack box which has incorporated in its top and bottom face a series of electrical rod heating elements thermostatically controlled or other suitable devices to provide heat to dry and cure the lines of adhesive which fasten the strips of thin flexible material together, thereby forming the unexpanded honeycomb product.

It is another object of this invention to provide a method and machine for producing continuous unexpanded honeycomb whereby the thickness of the honeycomb product can be controlled within micro limits by incorporating toward the outer end of the stack box a double transverse moving cutter unit designed to reduce the thickness of the produced honeycomb to within a predetermined final microtolerance and to effect either a smooth or fuzzy edge finish to the top and bottom of the honeycomb, depending on the type of trimmed heads used. This thickness control is adjusted by microthreaded adjusting screws which determine the height position of the cutter heads from both the top and bottom of the honeycomb.

In the accompanying drawings;

FIG. 1 is a side elevation drawn schematically of the machine;

FIGS. 2a and 2b together schematically illustrate in plan view a machine constructed in accordance with the invention for practicing the method of the invention;

FIG. 2c illustrates the method used to expose and withdraw the pins in the pin conveyor belt;

FIGS. 3a and 3b taken together are a front elevation of the machine;

FIG. 3c is a perspective showing a cut strip as it would look being bent over a 45° plane of the top of each respective turn board to change the direction of the strips and place them in edgewise position in face-to-face relation to each other;

FIG. 8 is a vertical cross-sectional view of the pinning conveyor and a turn bar showing a plurality of strips of material pinned together, the thickness of the strips being exaggerated.

Figure 1:
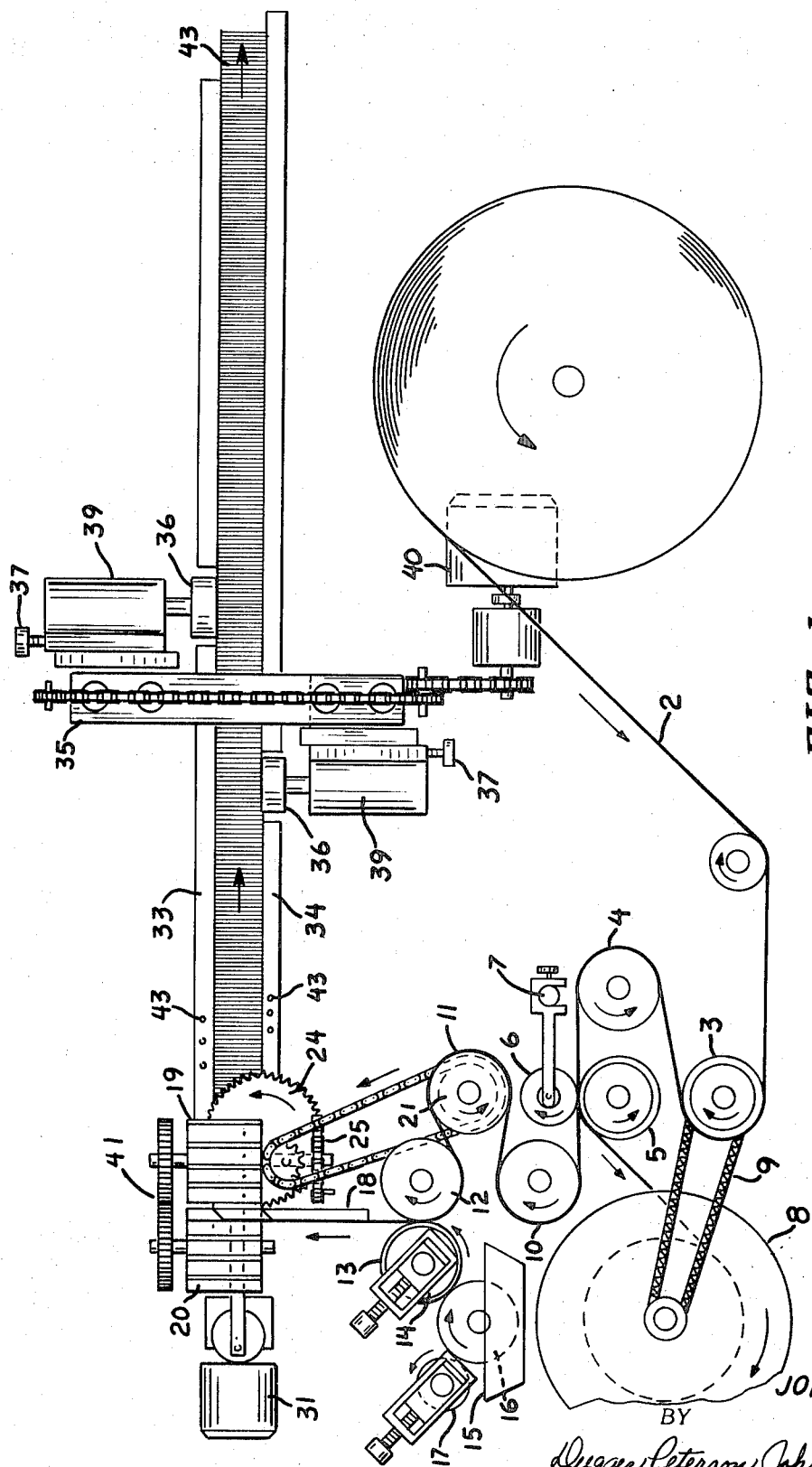
Figure 4:
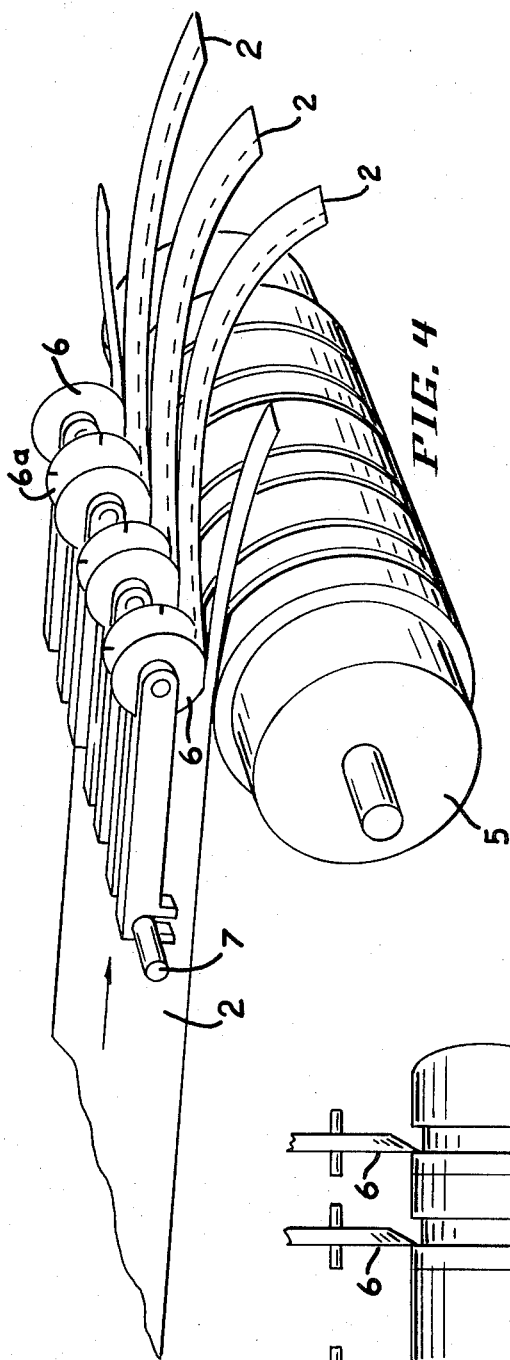
FIG. 4 is a perspective of the shear cutting unit showing the method of producing two thicknesses of honeycomb simultaneously.
Figure 7:
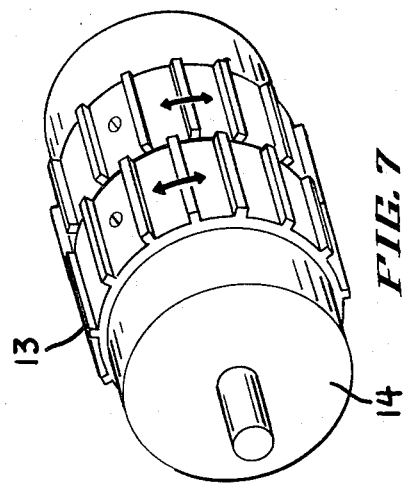
FIG. 7 is a perspective of the adjustable adhesive rings mounted on their mandrel roll.
Figure 5:
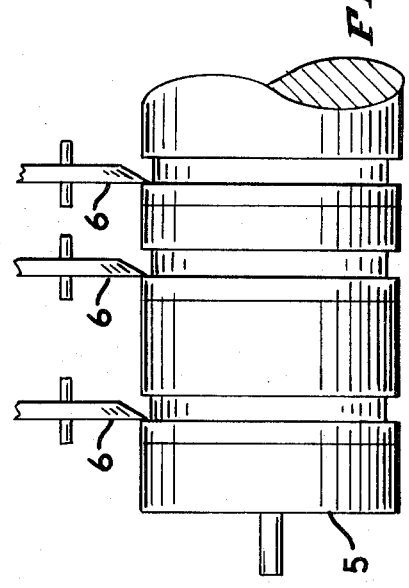
FIG. 5 is a front view of the cutting ring mandrel with the cutting discs properly placed against their respective cutting rings.
Figure 6:
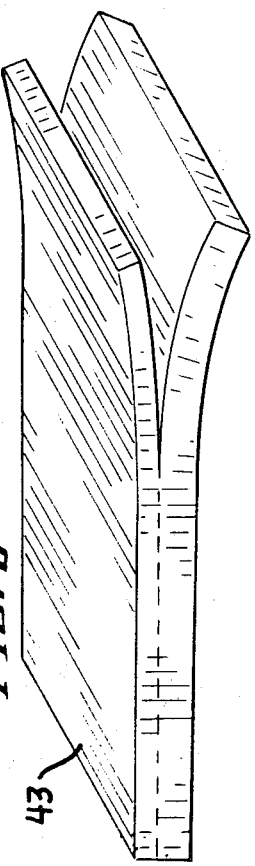
FIG. 6 is a perspective of a block of compressed multithickness honeycomb being pulled apart into two thicknesses after being fabricated by the method shown in FIG. 4.

Referring to the drawings, there is illustrated somewhat schematically a machine embodying the principles of the invention and by means of which the steps constituting the method of the invention may be conveniently carried out.

The machine illustrated is designed to fabricate a cellular or honeycomb structure in compressed form of any reasonable width, thickness and cell size from a single supply roll or flexible web material and to fabricate this honeycomb structure in a multiple of thicknesses simultaneously if so desired. From a supply roll 1, a web of flexible material 2, is drawn off by passing around rubber faced drive rolls 3 and 4, and is carried over a cutting edged mandrel 5, having circular cutting blades 6, placed one above each cutting edge ring on the mandrel in such a way as to perform a shear cutting action on the web as it passes between the cutting rings and circular blades, cutting the web into a plurality of narrow strips, or a plurality of strips of varying widths depending on whether the finished product is to be of one thickness or made in a multithickness to be pulled apart into two or more thicknesses after fabrication. The cutting mandrel 5, is constructed in such a way that the spacing of the cutting rings thereon can be varied by properly dimensioned spacers to result in cutting strips of any desired width to produce a finished honeycomb product of any thickness. The circular cutting blades 6, being mounted on a transverse bar 7, are constructed so as to allow them to be set at any transverse position to match their respective cutting ring resulting in the proper shear action to shear cut the web. Multiple thicknesses can simultaneously be cut the same way using circular cutting blades having thin slits in their cutting edge and placed in position on the proper shear or cutting ring to effect a partially cut strip along the length of the completely cut strip. As this web is cut into strips, there will usually be a narrow strip on the extreme outer edge of each side of the web that is considered as waste material. In order to gather this waste, two reels 8 are mounted, one on each side of the machine in direct line with its respective waste being cut, and powered to turning purposes by coil spring slip drives 9 from each side of roll 3. As the waste strips are cut, they will have been attached to their respective reel and as roll 3 revolves, the coil spring drives 9 set on proper ratio pulley sheaves, will cause the reels to attempt to turn and at a faster speed than the surface speed of roll 3. This will cause the waste material to be wound on its respective reel under tension, the degree of tension determined by the resistance to slippage of the coil spring drives against the retarding effect of the waste material to be wound on its respective reel under tension, the degree of tension determined by the resistance to slippage of the coil spring drives against the retarding effect of the waste strips. From the shear cutting unit 5 and 6, the now slit web passes over feed rolls 10 and 11, which keep the cut web in tension and then around the adhesive pressure roll 12, at which position transverse adhesive lines are applied by microadjusted multiple ring applicators 13, mounted on a mandrel roll 14. The adhesive which will normally contain a suitable catalyst and is preferably a quicksetting resin type, is stored in a glue container 15, in which the adhesive pickup roll 16 is made to rotate, coating it with adhesive. A microadjusted doctor roll 17, spreads the adhesive on the adhesive pickup roll 16 to a precise thickness and as this pickup roll 16 rotates against the microadjusted adhesive rings 13 a controlled thickness of adhesive is transferred to these rings which in turn imprint the transverse glue lines to the slit web 2 as it passes over the adhesive pressure roll 12. The adhesive applicator rings being mounted on a roll mandrel 14 are designed to correspond in width to the strip or cut web on which it is to apply adhesive, and the spacing of the imprint bars on the rings 13 determine the cell size of the finished product. These applicator rings are also designed to be rotated forward or backward an amount necessary to place the adhesive lines on the strips in proper relation to the glue lines on adjacent strips when these strips are brought into face-to-face relation to each other. Cell size of the finished honeycomb can be changed by substituting mandrel rolls having rings mounted to imprint the adhesive lines with the proper spacing to result in the desired cell size. After the transverse adhesive lines have been applied, the cut strips continue on and are made to bend around their respective turn board 18, the turning surface of which is set at 45° to the plane of the board, which changes the plane of travel of these strips 90° from vertical to horizontal and at the same time places each strip in an edgewise position in face to face relation to the adjacent strip with the previously applied adhesive lines facing in the same direction away from the turn board and in proper register with each of the adhesive applicator rings 13, thereby forming a multilayer strip 42 having adhesive lines in proper register. As the strips are passing over their respective turn boards and being placed in face to face relation to each other, they come in contact with a pin applying conveyor belt 19 which causes each strip to be pinned to its adjacent strip while moving in a forward direction. This action in effect pins the strips together keeping the adhesive lines in exact register to each other while these adhesive lines are pressure set to their adjacent strip as the multilayer strip passes through the laminating conveyor belt 20. As the multilayer strip 42 has exposed adhesive lines on its outer face, the purpose of which is to ultimately attach or fasten to other multilayer strips in the stack box, the pin inserting conveyor belt 19 is constructed in such a way that raised contact portions of its face are properly spaced to contact the outer surface of the multilayer strip between the adhesive lines, leaving them undisturbed. The pin inserting conveyor belt 19 is also constructed in such a way that the pins 44 are pushed into inserting position just before they come in contact with the strips being turned on their turn boards, by a properly set guide bar 45, positioned in such a way as to contact the head of each pin 44 as the conveyor moves forward pushing the pin into inserting position. The turn boards have horizontal grooves 18a opening to the pinning conveyor through which the one end portions of the pins move when the pins are in their extended position. At the other end of the pin conveyor, a pin extracting bar 46 automatically extracts each pin from the multilayer strip just before the strip leaves the laminating conveyor 20. As the multilayer strip is being pinned together while in a forward motion, it goes through the spring loaded laminating conveyor belt 20, which applies pressure against the adhesive lines of the multilayer strip, setting these adhesive lines hard against their adjacent strip, bonding the layer of strips together. Once this operation is accomplished the register maintaining pins 44 are no longer needed and are withdrawn from the strip. Once the cut strips have been imprinted with their adhesive lines, they are kept in tension by the pull of the laminating conveyor belt. In order to keep constant tension on these strips and be able to adjust this tension to suit fabricating conditions, a hydraulic slip clutch 21 is incorporated in the laminating conveyor belt drive which is designed to slip at a given torque factor, the force of which is adjustable by a hand turned valve 22. As the output shaft of this slip clutch 21 is geared to turn the laminating conveyor belt 20 at a surface speed in excess of the surface speed of the multilayer strip, a slipping action is generated within the clutch due to the resistive action of the multilayer strip within the confines of the laminating conveyor, forcing the laminating conveyor 20 to move at the same surface speed as the multilayer strip. The resistance of this slippage, as determined by the adjustment of the valve 22 in the clutch 21, will therefore control the tension being exerted on the multilayer strip. As this multilayer strip leaves the laminating conveyor 20, it moves along a straight path over a right-angle support member 24b of the flying cut off saw 24 to a belt conveyor 23. The purpose of this saw is to cut the endless multilayer strip into desired precise lengths at a precise position in relation to the adhesive lines therein. As the cut length determines the width of the final honeycomb product, it can be seen that there is no basic limit as to how wide the finished compressed honeycomb can be made. In order to maintain a consistent cell configuration of the honeycomb when it is expanded, these lengths must be cut identical to one another and at a certain point in relation to the exposed adhesive lines on the multilayer strip. In order to accomplish this precise action, there is incorporated in the flying saw unit an endless chain 25, which is of a predetermined length. This chain moves at the exact same speed as the laminating conveyor 20, being attached to and powered by it. Incorporated on this chain is a protruding pushpin 26, which is made to contact a push rod 27, which is connected to the flying saw 24. The push rod 27 has a microadjustment to precisely adjust the exact time the saw will begin to move along the same line and at the same exact speed as the multilayer strip. As the laminating conveyor 20 carrying the multilayer strip moves forward, the exact length chain 25 is made to revolve with it and when the protruding pushpin 26 comes in contact with the pushrod 27, the flying saw is caused to move with the strip. As the push rod is adjustable as to length it is possible to adjust to within micro limits the exact point along the strip that the saw will begin moving with the strip with each revolution of the chain 25. As the chain can be of any desired total length, it is possible to cut the endless multilayer strip into any desired lengths which in turn will result in a completed honeycomb product of corresponding width. The actual cutting of the strip is accomplished by a dog arrangement 24a which pushes the saw blade into the strip as soon as the saw and strip are moving together, the support member 24 being provided with a cutout 24c for the saw blade to move through. Once the strip is cut, the saw returns to its former position through an arm and spring arrangement 24d that is connected to pin 26 to be ready for another cutting cycle. The severed strips continue moving forward toward the stack box by means of a belt conveyor 23. Before the stack box 30 is reached, the strip makes contact with a microswitch 28, which causes the stack box push bar 29 to move back from the box 30 by means of an electric clutch and gear box arrangement 31 or other suitable means of activation. The severed strip 42 continues to move forward on the conveyor belt 23 to the far end of the stack box 30, and in front of the push bar 29, where it is stopped by a stop pin while simultaneously making contact with a microswitch 32, which activates the push bar in a forward motion, pushing the strip into the stack box 30. The exposed adhesive lines on the incoming strip contact the preceding cut strip in the stack box 30 as the push bar 29 places it in the box, pressing these adhesive lines firmly against the preceding strip, fastening them together. As this cycle is repeated over and over, the resultant action will be a continuous block of compressed unexpanded honeycomb which will be emerging from the other end of the stack box 30 at the same speed as the cut strips are being pushed into the front of the box. In order to facilitate drying and curing of the adhesive lines of the honeycomb in the stacking box, both the top 33 and bottom 34, of the box 30, contain electrical rods 43 or other suitable heating devices designed to generate the necessary heat to cure these adhesive lines. The top 33 is vertically movable relative the bottom, a spacer block (not shown) being provided between the top and bottom to hold them spaced as the initial multilayers are pushed into the stack box and resist the forward movement of said multilayers as one is pressed against another by push bar 29. The top and bottom are provided with top and bottom slots 33a, 34a, respectively, that are inclined at an angle that the honeycomb is supported by the box as it moves over the bottom slot; the trimmer heads being extended through said slots. In initially starting, about a foot of honeycomb is passed in advance of slot 34a before the bottom trimmer is actuated.

As the block of unexpanded honeycomb is being pushed through the stacking box 30 by the action of the push bar 29, the honeycomb is caused to come in contact, both top and bottom, with a transverse moving surface trimmer 35, which is designed to trim down the moving block of unexpanded compressed honeycomb to a predetermined microthickness. The final trimmed finish can be either smooth or fuzzy depending on the type of trimmer head used. Adjustment of the trimmer heads 36 toward or away from the surface of the honeycomb is accomplished by microthreaded adjustment screws 37. As the trimmed unexpanded honeycomb emerges from the trimmer unit 35, it is a completed product ready for expanding.

For the sake of clarity, the various drive units are not detailed, but it is to be understood that the main variable drive with clutch unit 44 is designed and intended to drive rolls 3, 4, 5, 10, 11, 12, 14, 16 and 17 by means of both chain and spur gear systems and all at an identical surface speed, while the shaft of roll 11 serves to drive the hydraulic slip clutch 21, which in turn drives the pin conveyor belt 19, and the laminating conveyor belt 20 by means of spur gears 41, as well as the endless chain 25, which in turn moves the saw 24 backward and forward. The saw blade 24 is powered by an electric motor, the shaft of which holds the saw blade. The conveyor 23, which carries the multilayer strip 42 to the stack box 30, is driven by a variable speed unit 38, while the push bar 29 is activated by a motor gear reducing box electric clutch unit 31, or other suitable means. The honeycomb thickness trimmer unit is powered by electric motors 39 designed to accommodate the proper designed trimmer heads 36 while the transverse motion of the trimmer unit 35 is accomplished by a microswitch-controlled reversing gear reducer and motor 40. The scrap material collector 8, it will be noted, is powered by roll 3 by means of coil spring endless drive units.

While the foregoing statements are indicative in a general way of the nature of the invention, the more specific objects and advantages will be apparent to those skilled in the art upon a full understanding of the new machine and method.

The preferred embodiment of the invention which was presented herein for the purpose of exemplification, will, of course, be understood that such embodiment is susceptible of modification within the spirit and teaching of this disclosure without departing from the invention as defined in the appended claims.

What is claimed is:

1. In a machine for producing a continuous unexpanded honeycomb product form a continuous web of thin flexible material, a severing assembly for longitudinally severing the web into a plurality of strips of material having opposite longitudinal edges and opposed surfaces between said edges, means for applying longitudinally spaced, transverse strips of adhesive to said strips of material, means for aligning said strips of material with the surface of one strip of material facing the surface of another strip of material, first conveyor means for receiving the aligned strips of material and compressing them to adhere one strip of material to the other along said adhesive strips to provide multiple layers of strips, and means for severing successive predetermined lengths of multiple layers of adhered strips of material from the remainder of said strips of material, said severing assembly including a cutting mandrel mounted to extend transverse to the continuous web for abutting against one surface of the web, at least one cutting knife cooperating with the cutting mandrel for continuously severing the web into a plurality of strips each having longitudinal edges, and means mounted on either transverse side of the cutting knife for cooperating with the cutting mandrel to continuously perforate the web parallel to and intermediate of the edges of the strips of material to permit the lengths of multiple layers of adhered strips of material to be pulled apart along the perforations to provide two pieces of honeycomb product.

2. The apparatus of claim 1 further characterized in that the perforating means comprises a circular cutting blade on each transverse side of the cutting knife, each cutting blade having a slitted cutting edge.

3. In a machine for producing an unexpanded honeycomb product, means for supplying a plurality of elongated strips of thin flexible material in face-to-face relationship that have spaced transverse strips of adhesive adhered to each strip of material on the same face thereof, elongated first endless pin-inserting conveyor means for receiving the above-mentioned strips of material from the supply means, pierce the received strips of material and advancing the strips of material in a given direction, said first conveyor means having a first run that has a first end portion adjacent the supply means and a second end portion remote from the first end portion and laminating means spaced from said first end portion and cooperating with said run for pressing the strips of material against one another and said run to adhesively join the strips of material to one another and move said strips of material away from the supply means, said first conveyor means including a plurality of pins mounted by the first run along the length thereof to pierce and pin the strips of material together as the strips of material move toward the laminating means and drive means for driving the conveyor means.

4. The machine of claim 3 further characterized in that the pins are mounted by said run for sliding movement transverse to the run between a retracted position and an extended position to pin said strips of material together, and that there is provided means adjacent the first end portion for moving the pins to an extended position as said run moves and means adjacent the second end portion for retracting the pins to extract the pins from the pin pierced material as the run moves, said retracting means being located relative the laminating means to retract the pins from strip portions of material that are between the laminating means and said run.

5. The machine of claim 4 further characterized in that said laminating means comprises a spring loaded second endless conveyor having a run to abut and press against the adjacent strip portion of material and that said drive means includes a slip clutch drive to the second endless conveyor that slips at a given torque to force the second conveyor to move at the same speed as the strips of material.

6. The machine of claim 5 further characterized in that the supply means includes means for supplying a plurality of elongated strips of material in edge to edge relationship with longitudinally spaced transverse strips of adhesive on the corresponding face of each strip of material that are advancing in a first direction at about right angles to the direction that the strips of material are advanced by said first conveyor means, and turning means for the strips of material to turn said strips of material from said given direction and align the edges of the strips of material with the strips of material in face-to-face relationship as said strips of material are moving, said turning means including a turning bar for each strip of material that has a turning surface to bear against the face of the respective strip opposite the face that has the adhesive strips.

7. The machine of claim 6 further characterized in that turning bar turning surfaces are adjacent said first run and intermediate said first end portion and the laminating means, each turning bar having a slot for the pins to move through when the pins are in their extended position.

8. The machine of claim 7 further characterized in that the turning surfaces, the first run and the pin extending means are located relative to one another to force the pins to their extended position as the pins are moved toward the turning bars and each pin is extended through the respective adjacent portion of strip of material as the last mentioned portion turns on the turning surface.

9. The machine of claim 7 further characterized in that the means for supplying the strips of material in edge to edge relationship comprises means for supplying a continuous web, means for severing the web into a plurality of strips of material and means for perforating each strip of material along the length thereof and intermediate its edges as it is severed from the web.

10. In a machine for producing an unexpanded honeycomb product from a plurality of elongated strips of flexible material, means for supplying a plurality of continuous elongated strips of material in edge-to-edge relationship that have a first face and an opposite face, a plurality of turning boards for abutting against the strips of material in edge-to-edge relationship, turning the strips of material through a substantial angle and aligning the one edges of the strips of material with the strips of material in face-to-face relationship and the first face of one strip of material facing the second face of the adjacent strip of material as each strip of material moves over the respective turning board, there being a turning board for each strip of material, means for applying transverse strips of adhesive to the first faces of the strips of material in proper spaced relationship that the adhesive strips on the turned portions of the strips of material register with one another, said adhesive strips being applied prior to the turning of the strips of material, and means for laminating the turned strip portions and maintaining the strips in tension back to the turned portions of the strips of material.

11. The machine of claim 10 further characterized in that the laminating means includes a first endless conveyor for pinning the strips of material together as the strips of material advance over the turning means and that extends a substantial distance away from the turning means, a spring-loaded second endless conveyor for pressing the pinned strips of material together and against the first conveyor at a location remote from the turning means, and first drive means for driving said conveyors, said drive means including a driven hydraulic slip clutch and a drive connection from the slip clutch to said conveyors for driving said conveyors, said slip clutch being adjusted to slip at a given torque factor to drive the second conveyor at the same surface speed as the strips of material between said conveyors.

12. The machine of claim 11 further characterized in that there is provided flying means in advance of the laminating means for movement parallel to the strips of material leaving the laminating means and transverse thereto for cutting the strips of material into predetermined lengths, and flying saw drive means connected to and driven by said drive connection for moving the flying saw means at the same speed and in the same direction as the strips of material that are being cut and then moving the flying saw means in the opposite direction.

13. The apparatus of claim 10 further characterized in that adhesive applying means comprises a pressure roll having the strips of material in edge to edge relationship extended partially therearound, a driven mandrel adjacent the pressure roll and extended transverse to the direction of movement of the portions of the strips of material adjacent thereto, and a ring applicator for each strip of material adjustably mounted on the mandrel to rotate therewith, each ring applicator having a plurality of angular spaced protrusions for rotatably abutting against the strip portions extended around the pressure roll for applying transverse adhesive strips to the strips of material, and means for supplying adhesive to the adjacent ring applicator protrusions, that the pressure roll and ring applicators have strip exit nips substantially directly vertically below the turning boards, that the laminating means includes first conveyor means extending horizontally to convey the turned strips of material away from the turning board with the one edges of the material turned strip portions substantially vertically above the opposite edges of said material turned strip portions, and that each turning board has a turning surface at an angle of about 45° to the vertical to turn the respective strip of material through an angle of about 90° as the respective strip of material moves over the turning board.

14. In a machine for producing a continuous unexpanded honeycomb product from a continuous web of thin flexible material, a supply roll for continuous roll of web material, drive roll means having the web passed at least partially therearound for drawing the web off the supply roll, a severing assembly for longitudinally severing the web into a plurality of strips of material having opposite longitudinal edges and opposed surfaces between said edges, said severing assembly including a cutting mandrel mounted to extend transverse to the continuous web drawn from the supply roll and a plurality of transversely spaced cutting knives acting in cooperation with the mandrel to sever the web into a plurality of first strips and a waste strip on each transverse side of the first strips with a longitudinal edge adjacent a longitudinal edge of the first strips, a pair of waste reels mounted in direct alignment with the respective waste strip as severed from the web to have the respective waste strip wound therearound, means for driving the drive rolls and the waste reels, means for applying longitudinally spaced, transverse strips of adhesive to said first strips of material, means for aligning said first strips of material with the surface of one of the first strips of material facing the surface of another of the first strips of material facing the surface of another of the first strips of material with strips of adhesive between each adjacent pair of first strips, first conveyor means for receiving the aligned strips of material and compressing them to adhere one strip of material to the other along said adhesive strips to provide multiple layers of strips, and means for severing successive predetermined lengths of multiple layers of adhered strips of material from the remainder of said strips of material.

15. The apparatus of claim 14 further characterized in that the last mentioned drive means includes means for driving one of said drive rolls, pulley sheaves for the one of said drive rolls and the waste reels, the pulley sheaves of the waste reels being smaller than that of the one drive roll, and a coil spring drive on said sheaves for transmitting the drive from the said one drive roll to the waste reels sheaves to maintain the severed waste strips in tension.

16. In a machine for producing a continuous unexpanded honeycomb product from a continuous web of thin flexible material, a severing assembly for longitudinally severing the web into a plurality of strips of material having opposite longitudinal edges and opposed surfaces between said edges, first means for applying longitudinally spaced, transverse strips of adhesive to said strips of material, second means for aligning said strips of material with the surface of one strip of material facing the surface of another strip of material with adhesive strips between said surfaces, third means for receiving the aligned strips and forming successive predetermined lengths of multiple layers of strips of material that have one strip of material adhered to the adjacent strip of material along the respective adhesive strips, a stack box for receiving said lengths of multiple layers, conveyor means for receiving the lengths of multiple layers from the third means and conveying them adjacent to the stack box with their one edges facing upward, pusher means for abuttingly engaging the surface of one multiple layer of strips and pushing said one multiple layer from the conveyor means into the stack box to force the opposite surface thereof into abutting relationship with the adjacent surface of another multiple layer of strips in the stack box and means for trimming the top and bottom edge portions of the multiple layers of the strips in the stack box as the multiple layers of strips are moved adjacent thereto by the pusher means.

17. The apparatus of claim 16 further characterized in that the stack box has a top and a bottom, said top and bottom being provided with elongated slots inclined relative the direction the multiple layers of strips are moved into the box by the pusher means, and that the trimming means includes trimmers extended into each of said slots, and means for moving the trimmers the length of the slots.

18. In a machine for producing a continuous unexpanded honeycomb product from a continuous web of thin flexible material, a severing assembly for longitudinally severing the web into a plurality of strips of material having opposite longitudinal edges and opposed surfaces between said edges, means for applying longitudinally spaced, transverse strips of adhesive to said strips of material, means in advance of the adhesive applying means for aligning said strips of material with the surface of one strip of material facing the surface of another strip of material as the strips of material move therepast, the aligning means comprising a turning bar for each severed strip of material, each turning bar having a turning surface set at 45° to the direction of travel of the strips of material prior to the strips of material abutting against the turning surfaces to turn the direction of travel of the strips of material 90° and align the strips of material to be in face-to-face relationship after leaving the turning surfaces, said turning bars being mounted to have the strips of material abut thereagainst in edge-to-edge relationship prior to the strips of material moving over the turning surface, first conveyor means for receiving the aligned strips of material and compressing them to adhere one strip of material to the other along said adhesive strips to provide multiple layers of strips, and means for severing successive predetermined lengths of multiple layers of adhered strips of material from the remainder of said strips of material.

19. The apparatus of claim 18 further characterized in that the first conveyor means includes a conveyor belt having a run extending adjacent and along said turning board surfaces, and means for mounting and moving said run in a direction 90° relative the direction of movement of the strips prior to abutting against said turning surfaces, the last mentioned means including a drive member abutting said belt and rotating about an axis that extends in generally the same direction as the movement of the strips of material prior to abutting said turning surfaces and generally parallel to the faces of the strips of material after they have moved over the turning surfaces.

20. The apparatus of claim 18 further characterized in that the first conveyor means comprises an endless first conveyor having a conveyor run traveling in the same direction as the strips of material after the strips of material have been turned 90° that extends adjacent the turning bars, a plurality of pins spaced along the length of the run and extendable through the conveyor run for pinning the turned strips of materials to one another as the strips of material pass over the respective turning surface, each of the turning bars having a slot for the pins to move through.

21. The machine of claim 20 further characterized in that the pins are slidably mounted by the conveyor run for movement between an extended pinning position and a retracted position out of pinning relationship to the strips of material and that there is provided means for moving the pins in said first conveyor run to their extended position prior to the pin being advanced to a turning surface of a turning bar and means for subsequently retracting the pins of said run.

22. The apparatus of claim 21 further characterized in that the first conveyor means includes an endless laminating second conveyor having a second run for pressing the pinned strips against the first-mentioned run, said pin-retracting means being located to retract the pins after the respective pin has been moved so that the portions of strip material pinned thereby have been pressed between said conveyors.

23. The machine of claim 22 further characterized in that the adhesive-applying means includes a driven mandrel, that the second conveyor comprises a spring loaded conveyor for retaining the strips of material in tension back to the adhesive-applying means, means for driving the spring-loaded conveyor including a slip clutch to slip at a given torque factor to force the spring-loaded conveyor to move at the same speed as the multiple layer of strips, the above mentioned drive means including means for driving said mandrel and first conveyor at speeds that each strip of material after passing over the turning surface has its adhesive strips aligned with the adhesive strips of the other turned strips of material and that the strips of material are pinned intermediate the adhesive strips.

24. The machine of claim 18 further characterized in that the first conveyor means includes means for pinning the severed strips of material together at spaced locations along the strips of material as they move from the turning bars and before they are pressed together to adhere one strip of material to another.

25. The machine of claim 24 further characterized in that the pinning means includes a first endless conveyor belt having a surface for abutting against a surface of an adjacent strip of material, a plurality of spaced pins slidably extended through said belt, means for forcing the pins through said belt surface and through the adjacent strips of material as the strips move away from said turning bars, and means for retracting said pins to withdraw them from the strips of material prior to the time said belt run moves out of engagement with said strips of material 26. The apparatus of claim 25 further characterized in that said first conveyor means includes a second endless conveyor having a run for applying pressure against the strips of material having the pins extended therethrough to join the strips of material together.

27. The machine of claim 26 further characterized in that the second conveyor comprises a spring loaded conveyor belt that in cooperation with the first conveyor belt retains the strips of material in tension along their lengths back to the adhesive applying means.

* * * * *